INVENTOR.
JAMES FEENEY
BY
Wm J Nolan
ATTORNEY

United States Patent Office 3,544,887
Patented Dec. 1, 1970

3,544,887
GYROMAGNETIC RESONANCE SPECTROMETER WITH MEANS FOR SELECTING PREDETERMINED OPERATING CONDITIONS
James Feeney, 6 Church Close, Horsell,
Woking, Surrey, England
Filed Mar. 1, 1968, Ser. No. 709,632
Claims priority, application Great Britain, June 16, 1967, 27,956/67
Int. Cl. G01n 27/78
U.S. Cl. 324—.5          5 Claims

ABSTRACT OF THE DISCLOSURE

A gyromagnetic resonance spectrometer is disclosed which employs means for selecting a certain predetermined set of operating conditions to obtain a certain standard output spectrum, thereby permitting a relatively unskilled operator to obtain a standard output.

---

The spectrometer includes a radio frequency transmitter for irradiating the sample to be investigated in a polarizing magnetic field at a certain carrier frequency. An audio frequency field modulator modulates the polarizing magnetic field to produce a sideband of the rf carrier in the sample at its resonant frequency, thereby exciting resonance of the sample. A receiver detects the resonance signals emanating from the sample. A scan generator scans the polarizing magnetic field to scan through the spectral lines of the sample to produce an output spectrum signal which is recorded.

Adjustments are provided for various operating conditions such as intensity of the audio field modulation, scan width, time duration of the scan, and cutoff frequency of the low pass filter in the receiver. A push button control is provided which automatically selects a certain predetermined set of adjustments for the aforecited operating conditions to produce an output spectrum having standard characteristics.

DESCRIPTION OF THE PRIOR ART

Heretofore, gyromagnetic resonance spectrometers have been built which employed "front panel" adjustments of the various operating conditions such as, intensity of the radio frequency resonance exciting field in the sample, cutoff frequency of the low pass filter in the receiver, width of the scan, and time duration of the scan. While such adjustments are desirable for a skilled operator such that he may obtain the ultimate in performance from the spectrometer, they often spell the downfall for a relatively untrained operator. Heretofore, no means have been provided for selecting a proper set of the aforecited operating conditions to assure the operator a reasonable chance of obtaining an acceptable spectrum from the sample under analysis.

It should also be considered that reference books of gyromagnetic resonance spectra are available to operators of spectrometers. Such reference books contain thousands of spectra for known molecules. These spectra are typically taken under certain standard conditions of scan width, duration of scan, etc. Therefore, it is desirable that the spectrometer have means for selecting a predetermined set of operating conditions to produce spectra taken under the same standard operating conditions as those of the reference books such that spectra obtained can be compared directly with those of the reference book.

SUMMARY OF THE PRESENT INVENTION

The principal object of the present invention is the provision of an improved gyromagnetic resonance spectrometer.

One feature of the present invention is the provision, in a gyromagnetic resonance spectrometer, of means for selecting a certain predetermined set of operating conditions of scan and receiver filtering to produce output spectra having a certain predetermined characteristic, whereby relatively unskilled operators can obtain acceptable output spectra.

Another feature of the present invention is the same as the preceding feature wherein the means for selecting the set of operating conditions includes a control operatively interconnecting the scan and filter adjustments for automatically selecting the predetermined set of conditions when actuated, thereby greatly facilitating adjustment of the spectrometer.

Another feature of the present invention is the same as any one or more of the preceding features wherein the predetermined set of operating conditions also include a setting for the amplitude of the radio frequency resonance exciting field in the sample, whereby satisfactory sensitivity is obtained without saturation line broadening of the resonance lines of the sample.

Another feature of the present invention is the same as any one or more of the preceding features wherein the predetermined scan width setting is about 500 Hz.

Other features and advantages of the present invention will become apparent upon a perusal of the following specification taken in connection with the accompanying drawings wherein:

DESCRIPTION OF THE PREFERRED EMBODIMENTS

Figure 1:
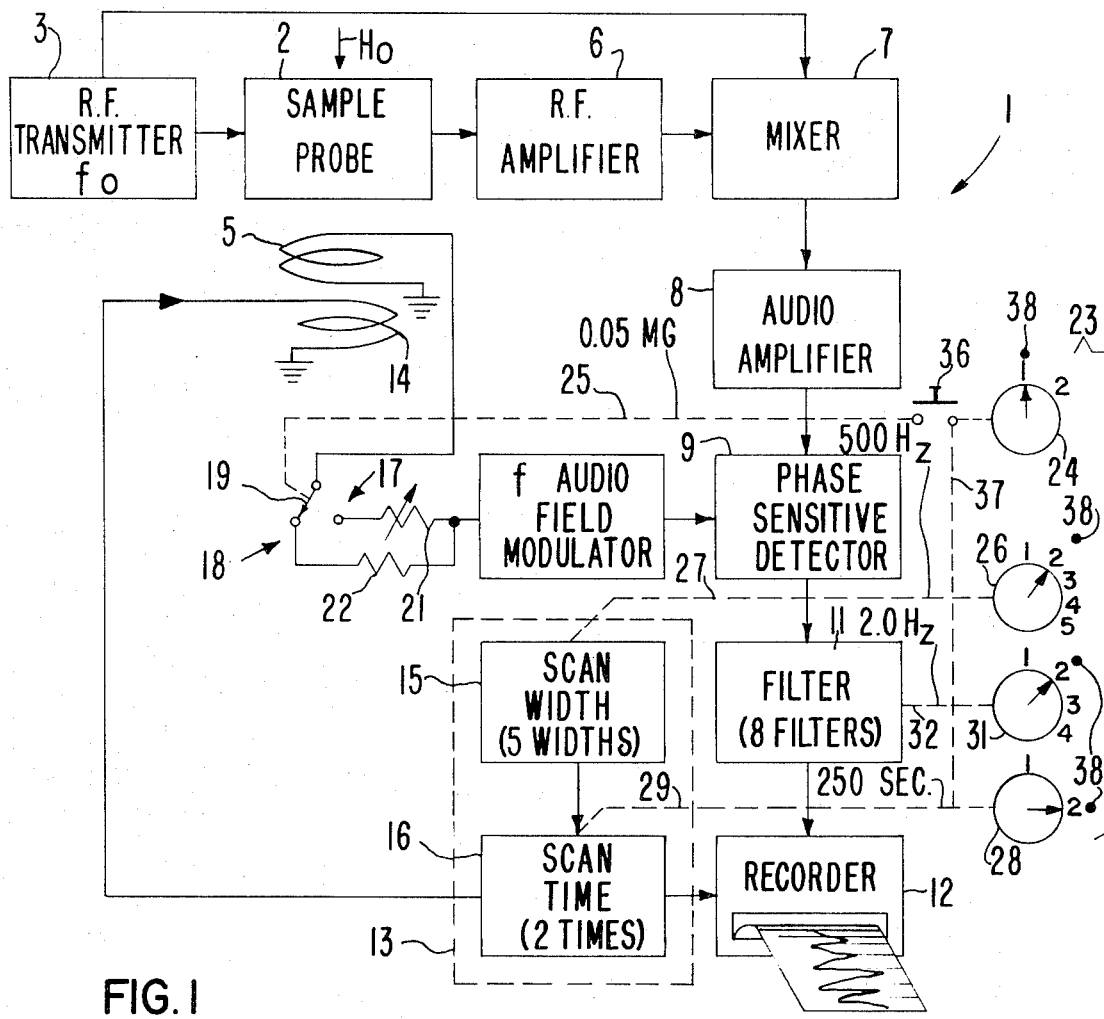
FIG. 1 is a schematic block diagram of a spectrometer incorporating features of the present invention.

Referring now to FIG. 1, there is shown a nuclear magnetic resonance spectrometer 1 incorporating features of the present invention. A sample of matter to be investigated is disposed in a sample probe 2 immersed in a unidirectional polarizing magnetic field $H_o$ as of 14.1 kg. A radio frequency transmitter 3, operating at a certain carrier frequency $f_o$ near the nuclear resonance frequency of the sample under analysis, such as, for example, 60 mHz., supplies the carrier signal to the probe 2. Within the probe 2, a tuned coil is tuned for the resonance frequency of the nuclei to be analyzed. The coil is excited with the carrier signal to irradiate the sample with a radio frequency magnetic field at the carrier frequency $f_o$.

An audio frequency field modulator 4 modulates the polarizing magnetic field $H_o$ at a certain audio frequency $f_1$ to produce a sideband of the carrier frequency at $(f_o+f_1)$ within the sample for exciting resonance of the sample at the sideband frequency. As used herein, audio frequency 4 is defined to include the audible range plus those frequencies above the audible range up to 2 mHz. The polarizing field is modulated by feeding the output audio frequency current of the field modulator 4 through a modulating coil 5 disposed adjacent or made as a part of the probe 2.

The excited resonance signal emanating from the sample is picked up by coil structure in the probe 2 and fed to a radio frequency amplifier 6 and thence to one input of a mixer 7. A sample of the carrier signal at $f_o$ is fed to the other input of the mixer 7 as by an external lead or by being coupled through with the resonance signal to produce an audio frequency output resonance signal at $f_1$, which is fed to an audio frequency amplifier 8. The output of the audio amplifier 8 is fed to one input of a phase sensitive detector 9. A sample of the audio frequency modulator signal at $f_1$ is fed to the other input of the phase sensitive detector 9.

Figure 3:
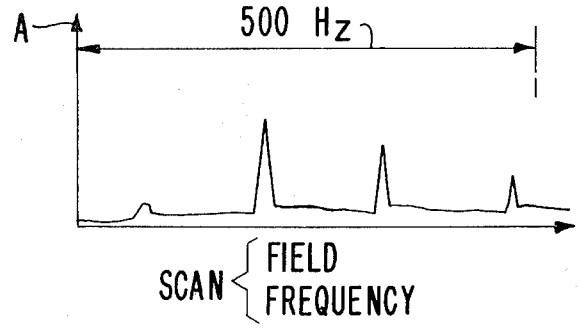
FIG. 3 is a spectrum of a sample under analysis obtained using the set of predetermined operating conditions.

The output of the phase sensitive detector 9 is a slowly varying signal representative of resonance of the sample which is fed through a low pass filter 11 to one input of a recorder 12 for recording versus a scan signal derived from a scan generator 13 to produce an output spectrum of the sample under analysis. The scan generator 13 scans the polarizing magnetic field intensity $H_o$ through the resonance lines of the sample to obtain an output spectrum as recorded in recorder 12 and as shown in FIG. 3. The scan generator 13 scans the polarizing field $H_o$ by feeding a slowly changing direct current through a coil 14 disposed adjacent the probe 2.

The scan generator 13 includes a scan width controller 15 for determining the width in Hz. or milligauss of the spectrum to be scanned. A scan time controller 16 is provided in the scan generator 13 for controlling the time duration of the scan.

Various spectrometer components are adjustable for adjusting the operating conditions of the spectrometer 1. More specifically, the audio field modulator 4 has two output channels 17 and 18 and a switch 19 for selecting either channel. Output channel 17 includes a variable resistor 21 for adjusting the magnitude of the field modulation current at $f_1$ and, thus, the intensity of the resonance exciting F.M. sideband at $(f_0+f_1)$. When operating on channel 17, adjustment of resistor 21 permits the operator to select a suitable intensity for the sideband excitation. Too high an amplitude of the sideband produces saturation of the resonance line being observed, whereas, too low an amplitude results in a loss of sensitivity. Channel 18 includes a fixed resistor 22 which is of a preselected value to provide an intensity for the sideband excitation which is below saturation for most resonance lines at the fixed carrier power level and at a certain scan rate as of 2 Hz./sec. A typical audio frequency field intensity, at $F_1$, for operation on channel 18 is about 0.05 milligauss; R.M.S. for a scan speed of 2 Hz./sec. Switch 19 is operated from an operator's front panel 23 via a suitable electromechanical device such as, for example, a rotary switch or relay operated switch, indicated by selector knob 24 and dotted line 25.

The scan width controller 15 includes five separate width adjustments, 500 Hz., 250 Hz., 100 Hz., 50 Hz., and 25 Hz. These adjustments are selected by a suitable electromechanical device such as, for example, a rotary switch or relay operated switch, indicated by selector knob 26 and dotted line 27. The scan time controller 16 includes two separate scan time duration adjustments, 50 seconds and 250 seconds. These adjustments are selected by a suitable electromechanical device such as, for example, a rotary switch or relay operated switch, indicated by selector knob 28 and dotted line 29.

The receiver channel filter 11 includes eight separate low pass filter adjustments or selections having high frequency cut off at 4 Hz., 2 Hz., 1 Hz., 0.4 Hz., 0.2 Hz., 0.1 Hz., 0.04 Hz., 0.02 Hz., respectively. These adjustments or selections are made by a suitable electromechanical device such as, for example, a rotary switch or relay operated switch, indicated by selector knob 31 and dotted line 32.

Figure 2:
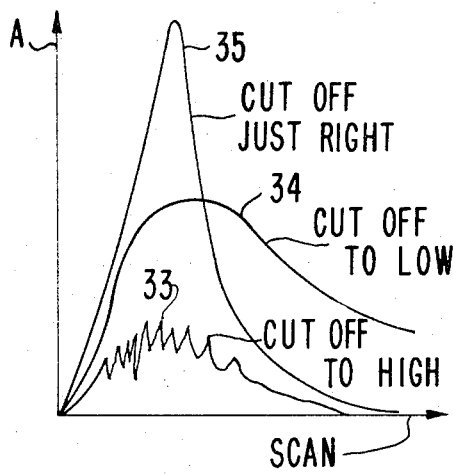
FIG. 2 is a spectrum of a single resonance line for three different settings of the filter in the receiver channel.

The effect of the low pass filters 11 on a line of the spectrum is shown in FIG. 2 for a given scan rate. If the high frequency cutoff is too high, unwanted noise will pass through the filter with the signal to produce a noisy line signal as shown by line 33. If the high frequency cutoff is too low, for the given scan rate, the signal will be averaged as shown by line 34. If the high frequency cutoff is just right, the line signal will be sharp without ringing and noise as shown by line 35.

Due to the interdependency of the operating conditions of the spectrometer, and particularly the dependency of the filter and the field modulator adjustments upon scan rate, it is possible to specify a predetermined set of operating conditions for a given scan rate which will typically yield a satisfactory output spectrum. Accordingly, a scan width of 500 Hz. is preselected as one operating condition since most spectra are recorded in reference books with 500 Hz. scan width. Also, this relatively wide scan will typically include at least one or more resonance lines of the sample under analysis. A scan time duration of 250 seconds is preselected to yield a scan rate of 2 Hz./sec. At 2 Hz./sec. scan rate, resistor 22 is preselected to provide a sideband excitation amplitude which is near to but less than saturation of the resonance lines. The 2 Hz. high frequency cutoff is preselected for filter 11 as being suitable for the 2 Hz./sec. scan rate.

These preselected operating conditions or adjustments are automatically obtained by a suitable electromechanical device such as a rotary switch or relay operated switch, indicated by push button 36 and dotted line 37. Push button control 36 is provided on the operator's front panel 23 and it serves to override previous settings of the control knobs 24, 26, 28, and 31 to obtain the certain set of predetermined operating adjustments or conditions.

As an alternative to one knob automatic selection of the predetermined set of operating conditions, these predetermined settings may be indicated on each of the indices for the various selector knobs 24, 26, 28, and 31. For example, colored dots may be painted opposite the preselected setting, as indicated by dots 38 or the preselected indices may be painted a different color than the rest.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyromagnetic resonance spectrometer, means for exciting gyromagnetic resonance of a sample under analysis in a polarizing magnetic field by producing a radio frequency magnetic field in the sample at the resonance frequency of the sample, means for receiving the resonance signal emanating from the sample and detecting same to produce an output resonance signal, means for scanning the resonance determining conditions of the spectrometer to produce an output resonance spectrum of the sample under analysis, said receiving means including an adjustable electric filter means for optimizing the output resonance spectrum signal, means for adjusting said filter means to change the band of frequencies passed therethrough for optimizing the resonance output signal, means for adjusting the scan rate of said spectrometer scan means, said means for producing a radio frequency magnetic field in the sample including, means for applying a radio frequency magnetic field to a sample at a certain carrier frequency, and means for modulating the polarizing magnetic field at a certain audio frequency to cause said carrier frequency and said audio frequency field to combine in the sample to produce a sideband radio frequency magnetic field at the resonance frequency of the sample, means including a fixed resistor in circuit with the field modulating means for setting the amplitude of the audio frequency field modulation as produced in the sample at a predetermined amplitude below a resonance saturation level for most resonance lines at a scan rate of 2 Hertz per second, and control means operatively interconnected to said scan means, said filter means, and said audio frequency amplitude setting means for setting the aforecited adjustments to a certain predetermined set of settings by only one setting of said control means to obtain an output spectrum having certain predetermined characteristics.

2. The apparatus of claim 1 wherein said means for adjusting the scan rate of said spectrometer includes, means for adjusting the time duration of scan, and means for adjusting the scan width and wherein said control means is additionally operatively interconnected to said scan duration and scan width adjusting means for establishing predetermined adjustments for scan duration and scan width.

3. The apparatus of claim 2 wherein said control means for selecting a certain predetermined set of adjustments selects about 500 Hz. as the scan width.

4. The apparatus of claim 3 wherein said control means for selecting a certain predetermined set of adjustments selects a band of frequencies to be passed by said filter means which falls between 0 Hz. and 4 Hz.

5. The apparatus of claim 1 wherein said control means for selecting a certain predetermined set of adjustments selects a certain scan rate in Hz. per second.

References Cited

A-60A, Nuclear Magnetic Resonance Spectrometer System, pub. by Varian Associates, 1965, pp. 4, 5 and 8 relied upon.

RUDOLPH V. ROLINEC, Primary Examiner

MICHAEL J. LYNCH, Assistant Examiner